United States Patent
Kozlov et al.

(10) Patent No.: US 7,604,726 B2
(45) Date of Patent: Oct. 20, 2009

(54) PLATINUM ALUMINIDE COATING AND METHOD THEREOF

(75) Inventors: Alexander S. Kozlov, Wharton, NJ (US); Svetlana Kozlova, legal representative, Moscow (RU); Derek Raybould, Denville, NJ (US); Siu-Ching D. Lui, Watchung, NJ (US); Thomas E. Strangman, Prescott, AZ (US)

(73) Assignee: Honeywell International Inc., Morristown, NJ (US)

( * ) Notice: Subject to any disclaimer, the term of this patent is extended or adjusted under 35 U.S.C. 154(b) by 719 days.

(21) Appl. No.: 10/753,675

(22) Filed: Jan. 7, 2004

(65) Prior Publication Data

US 2005/0145503 A1 Jul. 7, 2005

(51) Int. Cl.
- *C25D 15/02* (2006.01)
- *C25D 15/00* (2006.01)
- *C25D 5/50* (2006.01)
- *C25D 3/50* (2006.01)

(52) U.S. Cl. .............. 205/109; 205/191; 205/228; 205/264

(58) Field of Classification Search ............... None
See application file for complete search history.

(56) References Cited

U.S. PATENT DOCUMENTS

| | | | |
|---|---|---|---|
| 154,435 A * | 8/1874 | Adams, Jr. | 205/227 |
| 4,810,334 A * | 3/1989 | Honey et al. | 205/109 |
| 5,482,578 A | 1/1996 | Rose et al. | |
| 5,500,252 A | 3/1996 | Meelu | |
| 5,650,235 A | 7/1997 | McMordie et al. | |
| 5,688,607 A | 11/1997 | Rose et al. | |
| 5,833,829 A | 11/1998 | Foster | |
| 6,183,888 B1 * | 2/2001 | Alperine et al. | 205/227 |
| 6,218,029 B1 | 4/2001 | Rickerby | |
| 6,291,014 B1 | 9/2001 | Warnes et al. | |
| 6,299,971 B1 | 10/2001 | Maloney | |
| 6,306,277 B1 | 10/2001 | Strangman et al. | |
| 6,376,015 B1 | 4/2002 | Rickerby | |
| 6,455,167 B1 | 9/2002 | Rigney et al. | |
| 6,472,018 B1 | 10/2002 | Warnes et al. | |
| 6,521,113 B2 | 2/2003 | Strangman et al. | |
| 6,974,636 B2 * | 12/2005 | Darolia et al. | 205/109 |

(Continued)

FOREIGN PATENT DOCUMENTS

DE 10251902 6/2004

(Continued)

OTHER PUBLICATIONS

PCT International Search Report PCT/US2005/000294, Feb. 8, 2006.

(Continued)

*Primary Examiner*—Harry D Wilkins, III
(74) *Attorney, Agent, or Firm*—Ingrassia Fisher & Lorenz (57) ABSTRACT

Platinum containing coatings for corrosion and oxidation protection of a substrate, and platinum electrodeposition methods for coating a substrate. The coating may comprise platinum and at least one supplementary constituent, and the method may involve co-electrodeposition of platinum and the supplementary constituent from a single electrolyte composition. The supplementary constituent may comprise chromium, an oxidation protective reactive element, or an alloy of chromium with a reactive element. Components protected by such coatings are also disclosed.

24 Claims, 8 Drawing Sheets

U.S. PATENT DOCUMENTS

2005/0013994 A1    1/2005    Strangman

FOREIGN PATENT DOCUMENTS

| EP | 0567755 A1 | 11/1993 |
| EP | 0654542 | 5/1995 |
| EP | 0821076 A1 | 1/1998 |
| EP | 0940098 | 9/1999 |

OTHER PUBLICATIONS

R. Lowrie and D.H. Boone; Composite Coatings of CoCrAly Plus Platinum, Thin Solid Films, May 31, 1977, 8pgs, Elsevier Sequoia S.A. Lausanne, Netherlands.

KH.G. Schmitt-Thomas and M.Hertter, Improved Oxidation Resistance of Thermal Barrier Coatings, Surface and Coatings Technology, 1999, 5 pgs, Elsevier, Garching, Germany.

\* cited by examiner

PLATINUM ALUMINIDE COATING AND METHOD THEREOF

BACKGROUND OF THE INVENTION

The present invention generally relates to co-electrodeposition of platinum and a supplementary constituent to platinum aluminide coatings, and to methods for forming such coatings.

In modern gas turbine engines, the blades and vanes in the high pressure turbine section are exposed to temperatures in excess of 1000° C. for extended periods of time. Superalloy gas turbine engine components are commonly coated with platinum aluminide coatings to inhibit oxidation and corrosion of the superalloy surface. Protection provided by platinum aluminide coatings is due to selective oxidation of aluminum to form an alumina ($Al_2O_3$) scale that grows very slowly at high temperature by a diffusion process.

Impurities within the platinum aluminide coating, e.g., sulfur (S), phosphorus (P), and chlorine (Cl), can segregate to the interface between the coating and the alumina scale, weaken the interface, and thus promote spalling of the protective oxide scale. Periodic oxide spalling accelerates the consumption of aluminum from the platinum aluminide coating and reduces the oxidation life of the component. Impurity-induced oxide spalling of the protective oxide scale also limits the life of thermal barrier coatings that utilize platinum aluminide coatings as a bond coating.

U.S. Pat. No. 6,306,277 to Strangman et al. discloses an electroplating process for electrodeposition of platinum on superalloy substrates, and a platinum electrolyte for use in such electroplating process, wherein the electrolyte is stable and readily prepared. The electrolyte comprises the platinum salt, dinitrodiamine platinum ($Pt(NH_3)_2(NO_2)_2$), and an alkali metal carbonate or bicarbonate; and the process results in decreased contaminant levels of S, Cl, and P in the electroplated Pt layer, as compared with Pt layers deposited using prior art electrolytes.

It is known that the presence of chromium (Cr) in superalloy coatings (e.g., Cr containing platinum aluminide coatings) increases the corrosion resistance of superalloy components, and hence increases the life of such components, as compared with platinum aluminide coatings which substantially lack Cr.

EP 0821076 A1 to Wing discloses a process for forming a platinum aluminized chromised Ni-based superalloy, wherein the process involves the steps of: 1. forming a chromium enriched surface layer of the superalloy, e.g., by electroplating; 2. heating in a vacuum or protective atmosphere; 3. forming a platinum layer on the chromium enriched superalloy by electroplating, sputtering, etc.; 4. heating in a vacuum or protective atmosphere for one to four hours at 900° to 1150° C.; and 5. aluminizing the chromised, diffused, platinum coated Ni-based superalloy, e.g., by out of pack aluminizing for six hours at 1080° C. Thus, in the process of Wing, Cr and Pt are deposited on the superalloy in separate steps.

U.S. Pat. No. 5,482,578 to Rose et al. discloses a diffusion coating process for the deposition of a coating of chromium-containing $PtAl_2$ on a superalloy substrate. The process of the '578 patent involves: 1. deposition of a platinum group metal on the superalloy, e.g., by electroplating; 2. heating in vacuo at about 1900° F. for about an hour; 3. diffusion coating the platinum-group metallized superalloy with an Al/Cr powder; and finally 4. heat treating the Al/Cr diffusion coated, metallized superalloy at about 1925° to 2050° F. in hydrogen for about one to two hours. Again, in the process of Rose, et al., Cr and Pt are deposited on the superalloy in separate steps.

As can be seen, there is a need for a process for concurrently depositing platinum and a supplementary constituent on a substrate in a single step. There is a further need for a readily applied Cr containing platinum aluminide coating for superalloy gas turbine engine components. There is a further need for a process for coating superalloy components with a Cr containing platinum aluminide coating, wherein Pt and Cr are deposited on the superalloy surface in a single electrolytic step, such that processing costs are decreased, and productivity is increased. There is also a need for a reliable, stable, effective, and readily available electrolyte composition for co-electrodeposition of Pt and Cr on a substrate.

SUMMARY OF THE INVENTION

In one aspect of the present invention, there is provided a method for electroplating platinum, including providing a substrate, and electrolytically depositing a metal layer on a surface of the substrate. The metal layer comprises platinum and a supplementary constituent, and the metal layer is deposited from a single electrolyte composition during a single electrolytic step. The electrolyte composition comprises a platinum salt and particles of the supplementary constituent, and the particles of the supplementary constituent are deposited in the metal layer from the electrolyte composition.

In another aspect of the present invention, there is provided a method for electroplating platinum on a substrate, including electroplating platinum metal on the substrate via an electrolyte comprising particles of one or more supplementary constituents; and, concurrently with electroplating the platinum metal, depositing particles of the one or more supplementary constituents on the substrate. Beneficial supplementary constituents may comprise the following elements, which may be selected for their ability to form protective oxides (Al, Cr), enhance adhesion of protective oxides (Y, Zr, Hf, La, Sc, Si), enhance coating ductility (Ni, Co), enhance coating strength at high temperatures (Ta, Re), and reduce the diffusional interaction with the substrate (Ni, Co, Fe).

In still another aspect of the present invention, there is provided a process for preparing a coated component, including providing a substrate; electroplating a metal layer on a surface of the substrate, wherein the electroplated metal layer comprises platinum metal and particles of at least one supplementary constituent entrapped within the platinum metal; depositing aluminum on the electroplated metal layer; and forming a platinum aluminide coating on the substrate, wherein the platinum aluminide coating comprises the supplementary constituent. Elements present in the substrate, such as nickel, may be incorporated into the coating during a high-temperature post-plating diffusion heat treatment, high-temperature diffusion aluminizing processing, or post-aluminizing heat treatments. Major elements present within the coating may be Pt, Ni (from the substrate) and Al. Major constituent elements are predominately present in the form of intermetallic phases following aluminizing and heat treatment. In particular, the NiAl phase has solubility for Pt and other elements. Even though Ni may be a major constituent of the coating composition on a Ni-based substrate, the coatings are known in the industry as Pt-aluminides, which refers to the elements that are added during coating processing. We also use the industrial terminology for these coatings.

In yet another aspect of the present invention, a process for preparing a coated component may include providing a substrate; electroplating a platinum metal layer on the substrate, wherein the platinum metal layer is electrodeposited via an electrolyte composition comprising chromium particles; concurrently with electroplating the platinum metal layer, depositing the chromium particles on the substrate, wherein the chromium particles are entrapped within the platinum metal layer. The process may further include exposing the substrate to a first heat treatment; thereafter, aluminizing the substrate; and exposing the substrate to a second heat treatment to form a platinum aluminide coating on the substrate, wherein the coating comprises a solid solution of chromium within the intermetallic phase comprising Pt and Al. Particles of elemental Cr or Cr-carbides may also be dispersed within the coating microstructure. Carbon to form a carbide within the coating may be the result of a coating diffusion reaction with a carbon-containing substrate.

In an additional aspect of the present invention, there is provided a component including a metal substrate, and a platinum aluminide coating disposed on the substrate. The platinum aluminide coating comprises platinum and chromium, wherein the chromium is co-electrodeposited with the platinum, wherein the chromium forms a solid solution within the platinum, and the coating is free from, or substantially free from, chlorine, sulfur, phosphorus, or compounds thereof.

In a further aspect of the present invention, there is provided a corrosion- and oxidation resistant coating, comprising electrodeposited platinum, and chromium. The chromium is co-electrodeposited with the platinum, the chromium forms a solid solution within the platinum and substrate elements, such as Ni, Co, or Fe, and the coating is free from, or substantially free from, chlorine, sulfur, phosphorus, or compounds thereof.

In another aspect of the present invention, an electrolyte composition for electrodeposition of platinum comprises a platinum salt, a carbonate or bicarbonate of an alkali metal, and particles of at least one supplementary constituent such as Al, Cr, Y, Zr, Hf, La, Sc, Si, Ni, Co, Fe, Ta, and Re.

In yet another aspect of the present invention, an electrolyte composition for electrodeposition of platinum comprises dinitrodiamine platinum, an alkali metal carbonate or bicarbonate, and from about 0.2 to 80 g/L of chromium metal powder.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides corrosion- and oxidation resistant chromium- and/or reactive element-containing platinum aluminide protective coatings for substrates that are prone to corrosion and oxidation and, in particular, for substrates that are exposed to high temperatures in the range of 600 to 1150° C. during service conditions. The reactive element may be a metal such as Al, Cr, Y, Zr, Hf, La, Sc, Si, Ni, Co, Fe, Ta, and Re. Protective coatings of the instant invention may be applied to a broad range of substrates, including substrates comprising iron-, nickel-, and cobalt-based alloys, such as nickel-based superalloys. Protective coatings of the instant invention may be used in a diverse array of industrial applications where corrosion and oxidation protection of components or substrates is required, including: gas turbine engines used for aircraft propulsion, automotive power, and power generation, as well as chemical processing.

As a specific example, coatings of the instant invention may be used to protect components such as blades and vanes in the high pressure turbine section of gas turbine engines. Platinum aluminide coatings of the present invention may serve as a stand-alone protective coating. Platinum aluminide coatings of the present invention may also function as a bond coating for deposition of an additional layer, such as a ceramic thermal barrier coating, directly on the bond coating.

In general, platinum alloy protective coatings of the instant invention may be formed by a platinum electrodeposition process involving the concurrent electrodeposition of platinum and powder containing one or more supplementary constituents, such as chromium, chromium oxide, a chromium alloy, a reactive element, or an alloy of a reactive element, from a single electrolyte composition to form an electrodeposited metal layer on a substrate to be coated. Pt-aluminide coatings of the instant invention may be formed by subsequent aluminizing the platinum alloy coating and heat treatment.

In contrast, in prior art platinum aluminide coating processes, platinum and chromium have been deposited in separate steps. As an example, a prior art process for deposition of Pt and Cr disclosed in U.S. Pat. No. 5,482,578 involves deposition of a platinum group metal on the superalloy, heating in vacuo at about 1900° F. for about an hour, diffusion coating the platinum-group metallized superalloy with an Al/Cr powder, and finally heat treating the Al/Cr diffusion coated, metallized superalloy at about 1925° to 2050° F. in hydrogen for about one to two hours.

In further contrast to the prior art, and in one embodiment of the present invention, chromium and platinum constituents of a Cr containing platinum aluminide coating may be electrolytically co-deposited on a substrate surface, in a single step, using an electrolyte composition comprising a platinum salt and Cr metal powder.

An electrolyte composition of the instant invention may be free from, or substantially free from, sulfur, chlorine, and phosphorus impurities. Moreover, a platinum aluminide coating prepared using such an electrolyte composition may similarly be free from, or substantially free from, sulfur, chlorine, and phosphorus impurities. In contrast, electrolyte compositions used in prior art platinum aluminide coating processes result in the co-deposition of sulfur, chlorine, and phosphorus impurities in the electroplated platinum metal layer. The presence of sulfur, chlorine, and phosphorus impurities reduces the life of the coating and of the coated component.

An electrolyte for electroplating superalloy components previously disclosed in commonly assigned U.S. Pat. No. 6,306,277 contained the platinum salt, dinitrodiamine platinum, and was substantially free from sulfur, chlorine, and phosphorus impurities. However, in contrast to the instant invention, the electrolyte of the '277 was not described as containing metal particles or chromium.

Figure 1A:
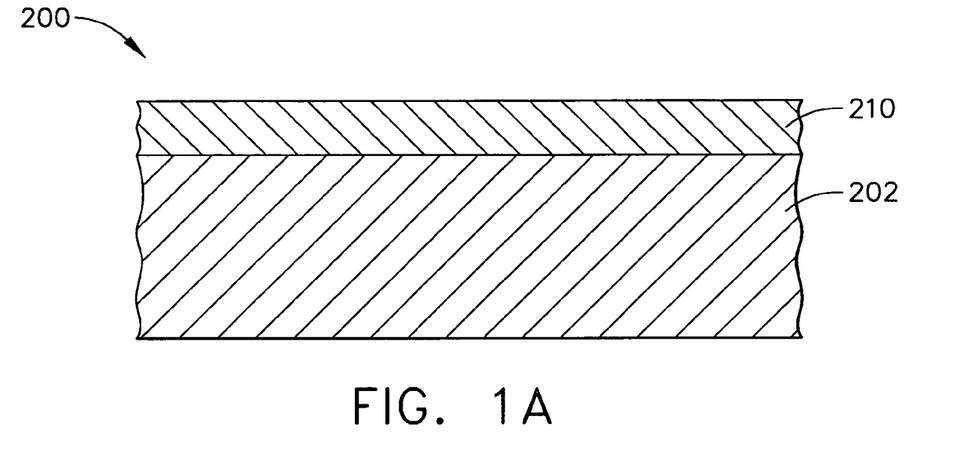
FIG. 1A is a sectional view schematically representing a component having a corrosion- and oxidation resistant coating, according to one embodiment of the invention.

FIG. 1A is a sectional view schematically representing a component 200, according to one embodiment of the invention. Component 200 may include a substrate 202 and a coating 210 disposed on substrate 202. Coating 210 may be a corrosion resistant protective coating. Coating 210 may also be an oxidation resistant protective coating. Coating 210 may be a stand-alone corrosion- or oxidation resistant coating. Coating 210 may also serve as a bond coating adapted for accepting an additional coating thereon (see, for example, FIG. 1B).

Again with reference to FIG. 1A, coating 210 may be a platinum aluminide coating. For example, coating 210 may comprise platinum and aluminum in an intermetallic compound. Coating 210 may further comprise at least one supplementary constituent. The at least one supplementary constituent may include a metal, such as chromium, or an oxide such as chromium oxide, both of which may impart the characteristic of corrosion resistance to coating 210. The at least one supplementary constituent may additionally, or alternatively, include one or more reactive elements, such as Al, Cr, Y, Zr Hf, La, Sc, Si, Ni, Co, Fe, Ta, and Re. The one or more reactive elements may impart the characteristic of oxidation resistance to coating 210. The one or more reactive elements may further impart, to some extent, the characteristic of corrosion resistance to coating 210. Similarly, the presence of chromium may impart, to some extent, the characteristic of oxidation resistance as well as corrosion resistance to coating 210. The one or more reactive elements may further impart, to some extent, the characteristic of ductility to coating 210. The one or more reactive elements may further impart, to some extent, the characteristic of high-temperature strength, or resistance to stress-relaxation, to coating 210.

In some embodiments, the at least one supplementary constituent may comprise a powdered chromium alloy, such as an alloy of chromium with at least one of Al, Y, Zr, Hf, La, Sc, Si, Ni, Co, Fe, Ta, and Re. Coating 210 may comprise platinum metal and a solid solution of at least one supplementary constituent. For example, after a post-plating heat treatment, coating 210 may be a solid-solution alloy comprising platinum, chromium, and the base-metal. The supplementary constituent, e.g., chromium, may be substantially uniformly distributed within coating 210. The platinum and supplementary constituent(s) of coating 210 may be electrodeposited, e.g., electroplated or electroformed, on substrate 202. As an example, the platinum of coating 210 may be electrodeposited via an electrolyte composition comprising a platinum salt and particles of at least one supplementary constituent. The chromium or other supplementary constituent of coating 210 may be co-electrodeposited with platinum. That is to say, the chromium or other supplementary constituent of coating 210 may be electrodeposited concurrently with electrodeposition of platinum from a single electrolyte composition, during a single electrolytic step.

The single electrolytic step for co-electrodeposition of chromium and platinum may provide an electroplated layer comprising platinum metal and a plurality of chromium particles entrapped therein. Herein, coatings, compositions, and processes of the invention may be described with reference to chromium, it being understood that in some embodiments other supplementary constituent(s), such as chromium oxide, various chromium alloys, or one or more reactive elements, may be used alternatively, or in addition to, chromium.

Again with reference to FIG. 1A, substrate 202 may comprise an iron-, nickel-, or cobalt-base alloy. For example, the substrate may be a nickel-base superalloy. Component 200 may be a gas turbine engine component, such as a turbine blade or vane. However, the present invention is not limited to gas turbine engine components, but rather the present invention may find applications wherever corrosion- and/or oxidation resistant coatings are required.

An electrolyte composition for concurrent deposition of platinum and chromium, according to one aspect of the invention, may comprise the platinum salt, dinitrodiamine platinum ($Pt(NH_3)_2(NO_2)_2$), in an amount typically in the range of from about 1 to 100 g/L, usually from about 5 to 75 g/L, and often from about 25 to 55 g/L.

The electrolyte composition for concurrent deposition of platinum and chromium may further comprise an alkali metal (Group I element) carbonate or bicarbonate, i.e., $M_2CO_3$ or $MHCO_3$, wherein M is Li, Na, K, Rb, or Cs. The alkali metal carbonate or bicarbonate may be present in an amount typically in the range of from about 1 to 200 g/L, usually from about 10 to 175 g/L, and often from about 50 to 150 g/L. The electrolyte composition may be prepared by adding the platinum salt and the alkali metal carbonate or bicarbonate to water.

The electrolyte composition for concurrent deposition of platinum and chromium may further comprise particles of at least one supplementary constituent. As an example, the electrolyte composition for concurrent deposition of platinum and chromium may comprise chromium metal powder. The particles of chromium metal powder in the electrolyte composition may have a mean diameter in the range of from about 1 to 50 microns, usually from about 1 to 20 microns, and often from about 1 to 10 microns. The electrolyte composition for the concurrent deposition of platinum and chromium may comprise particles in the range of from about 0.2 to 400 g/L, usually from about 0.2 to 50 g/L, and often from about 1 to 20 g/L. Chromium powder may be alloyed with one or more supplementary constituents. Alternatively, an electrolyte composition for concurrent deposition of platinum and one or more supplementary constituents may include particles consisting entirely of one or more supplementary constituents other than chromium.

The electrolyte composition for concurrent deposition of platinum and chromium may be free from, or substantially free from, chlorine (Cl), sulfur (S), phosphorus (P), or compounds thereof. For example, the electrolyte composition may comprise from zero to trace quantities of sulfur, chlorine, and phosphorus. Similarly, coating 210 prepared from co-electrodeposited Pt and Cr according to the present invention may be free from, or substantially free from, chlorine (Cl), sulfur (S), phosphorus (P), or compounds thereof.

After aluminizing and heat treatment have been completed, platinum aluminide coating 210 may have a thickness in the range of from about 5 to 100 microns, typically in the range of from about 10 to 70 microns, and usually in the range of from about 20 to 50 microns.

Figure 1B:
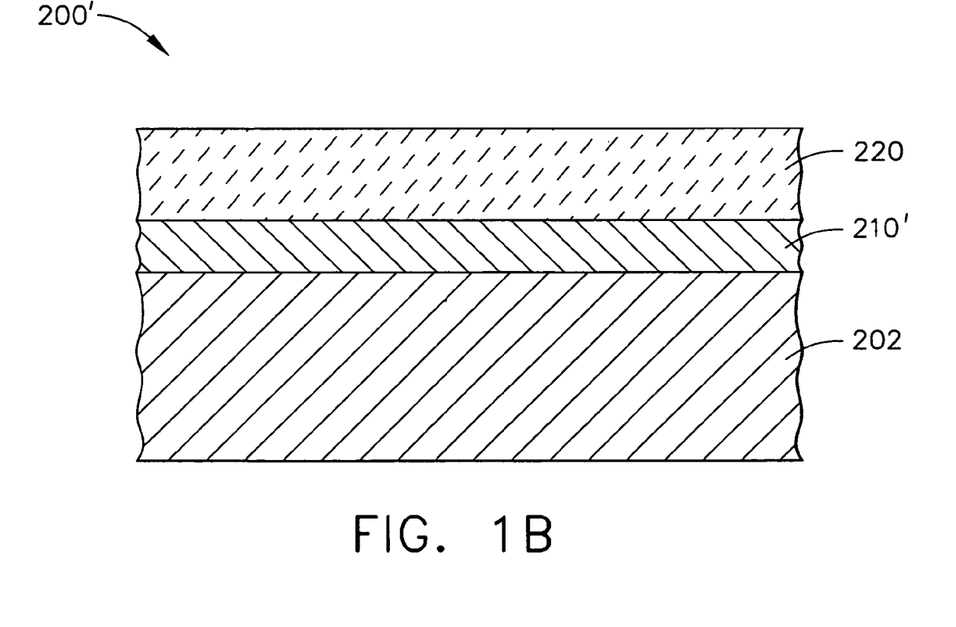
FIG. 1B is a sectional view schematically representing a component having a platinum aluminide coating disposed on a substrate, and an additional layer disposed on the platinum aluminide coating, according to another embodiment of the invention.

FIG. 1B is a sectional view schematically representing a component 200', according to another embodiment of the invention. Component 200' may include a substrate 202 and a coating 210' disposed on substrate 202. Coating 210' may have the same, or similar, characteristics and features as described herein for coating 210 (FIG. 1A). Similarly, coating 210' may be formed using the same, or similar, processes as for forming coating 210.

Coating 210' may serve as a platinum aluminide bond coating, and component 200' may further include an additional layer 220 disposed on bond coating 210'. As an example, additional layer 220 may be a columnar, ceramic thermal barrier coating. Such a thermal barrier coating may comprise a stabilized zirconia, such as an yttria stabilized zirconia. A columnar, ceramic thermal barrier coating is disclosed in commonly assigned, co-pending U.S. patent application Ser. No. 10/621,981, filed Jul. 16, 2003 (entitled: Thermal Barrier Coating with Stabilized Compliant Microstructure), the disclosure of which is incorporated by reference herein in its entirety.

Figure 2:
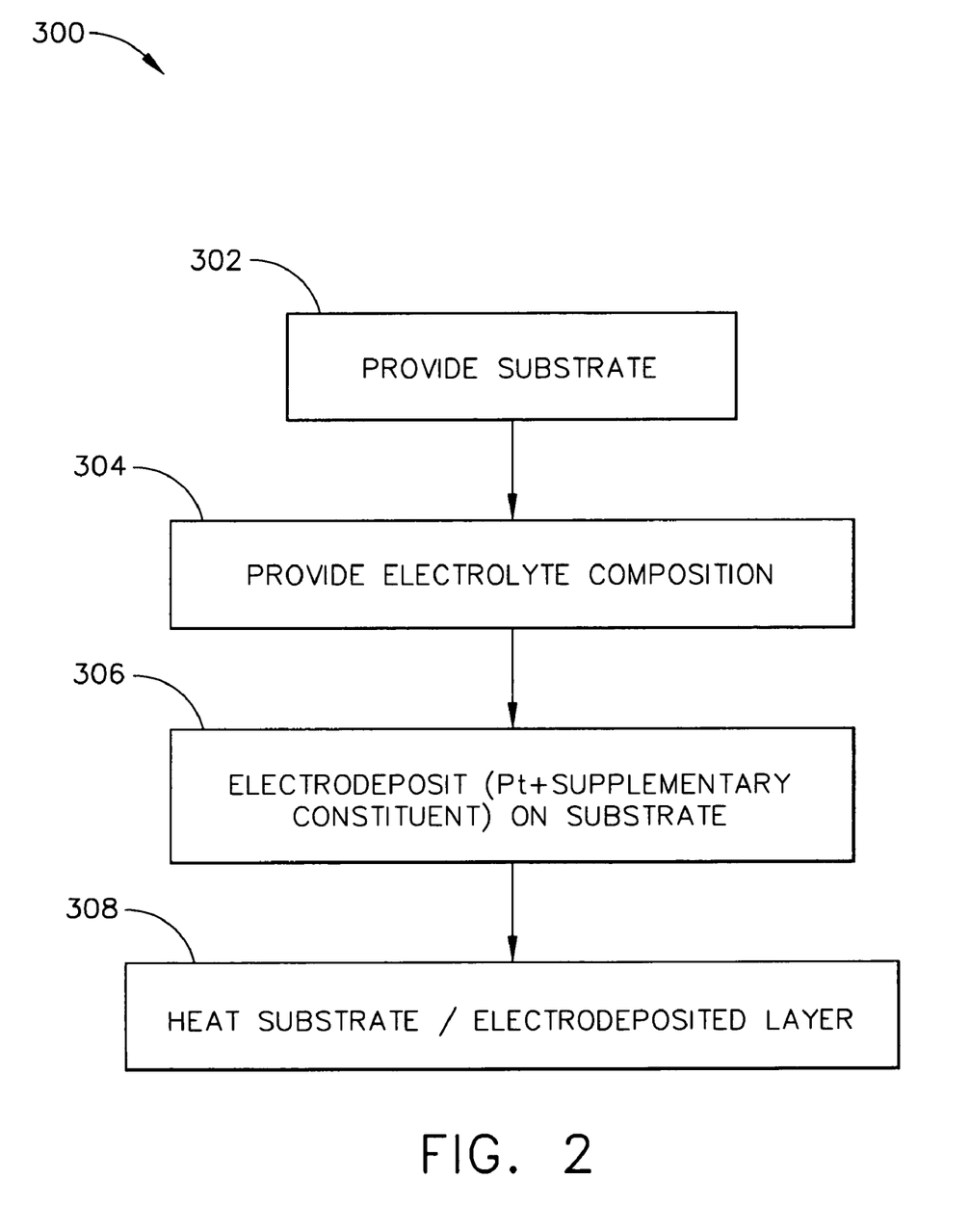
FIG. 2 schematically represents a series of steps involved in a method for electroplating platinum and a supplementary constituent on a substrate, according to one embodiment of the invention.

FIG. 2 schematically represents a series of steps involved in a method 300 for electroplating platinum and a supplementary constituent on a substrate, according to one embodiment of the invention. Step 302 may involve providing a substrate. The substrate may comprise iron-, nickel-, or a cobalt-base alloy. The substrate may be a nickel-based superalloy, e.g., a superalloy for a gas turbine engine component.

Step 304 may involve providing an electrolyte composition. The electrolyte composition may have characteristics and constituents as described hereinabove. For example, the electrolyte composition may include a platinum salt, an alkali metal carbonate or bicarbonate, and particles of one or more supplementary constituent(s). The supplementary constituent (s) may comprise particles in the form of a metal powder or metal oxide powder. The one or more supplementary constituents may include a corrosion resistant material, such as chromium metal, chromium oxide, and/or Al, Cr, Y, Zr, Hf, La, Sc, Si, Ni, Co, Fe, Ta, and Re. As an example, the one or more supplementary constituents may comprise a mixture of chromium powder, or chromium oxide powder, with elemental or alloyed particles of a reactive element such Al, Cr, Y, Zr, Hf, La, Sc, Si, Ni, Co, Fe, Ta, and Re. In some embodiments, the electrolyte composition may include a supplementary constituent comprising a chromium alloy, wherein the chromium alloy comprises chromium and one or more reactive elements such as Al, Y, Zr, Hf, La, Sc, Si, Ni, Co, Fe, Ta, and Re. Quantitative data on the composition of an electrolyte of the instant invention are provided elsewhere herein.

Again with reference to FIG. 2, step 306 may involve electrodepositing platinum metal on the substrate and, at the same time, depositing at least one supplementary constituent on the substrate surface, via the electrolyte provided in step 304. That is to say, according to the instant invention, particles of a supplementary constituent, such as chromium, chromium oxide, a reactive element, or a chromium alloy, may be electrodeposited concurrently with electrodeposition of platinum in a single electrolytic step (e.g., step 306 of method 300) from a single electrolyte composition. The reactive element may be a metal or alloy comprising Al, Cr, Y, Zr, Hf, La, Sc, Si, Ni, Co, Fe, Ta, and Re. Prior to step 306, the substrate may be prepared by grit blasting or mechanically polishing the substrate surface to be coated. The substrate may be further prepared by chemical activation, for example, by exposure to HCl.

The electrolyte composition may be agitated or sonicated prior to step 306. The electrolyte composition may be stirred during step 306. Accordingly, during step 306 particles of the one or more supplementary constituents may be maintained in suspension.

Step 306 may involve applying a voltage between the substrate (cathode) and one or more anodes. The one or more anodes may each comprise platinum. The voltage between the substrate and the one or more anodes may be in the range of from about 1.2 to 2.2 volts, usually from about 1.5 to 2.0 volts, and often from about 1.7 to 1.9 volts. The current density per unit area of the substrate may be in the range of from about 2.0 to 3.0 A.dm$^{-2}$. During step 306, the electrolyte composition may be maintained at a temperature in the range of from about 60 to 100° C., usually from about 75 to 95° C., and often from about 82 to 86° C.

In step 308, the substrate and the electrodeposited layer formed during step 306 may be heated or annealed. For example, heat may be applied to promote bonding of the electrodeposited layer to the substrate surface, or to interdiffuse constituents of the electrodeposited layer with the surface layer of the substrate.

In some embodiments, step 308 may involve performing a first heat treatment, or annealing, the substrate. The first heat treatment may be performed at a relatively low temperature sufficient to promote bonding of the electrodeposited layer to the substrate surface. A temperature in the range of from about 300 to 650° C. may be sufficient to promote such bonding of the electrodeposited layer to the substrate surface. The coating after heat treatment in the above range may still consist of platinum and particles of the supplementary constituent material.

Alternatively, the heat treatment of step 308 may be performed at a relatively high temperature sufficient to promote interdiffusion of constituents of the electrodeposited layer with the adjacent surface layer of the substrate surface. A temperature in the range of from about 1000 to 1100° C. may be sufficient to promote such diffusion of constituents of the electrodeposited layer and the substrate. When a heat treatment in the 1000 to 1100° C. range is performed, the resulting coating may comprise a solid solution alloy; e.g., the coating may comprise a metallic solid solution of Ni, Pt and Cr when the substrate is a nickel-base alloy.

Step 308 may be performed, for a period in the range of from about 15 minutes to four (4) hours, in a protective atmosphere (e.g., in argon), or under vacuum.

Figure 3:
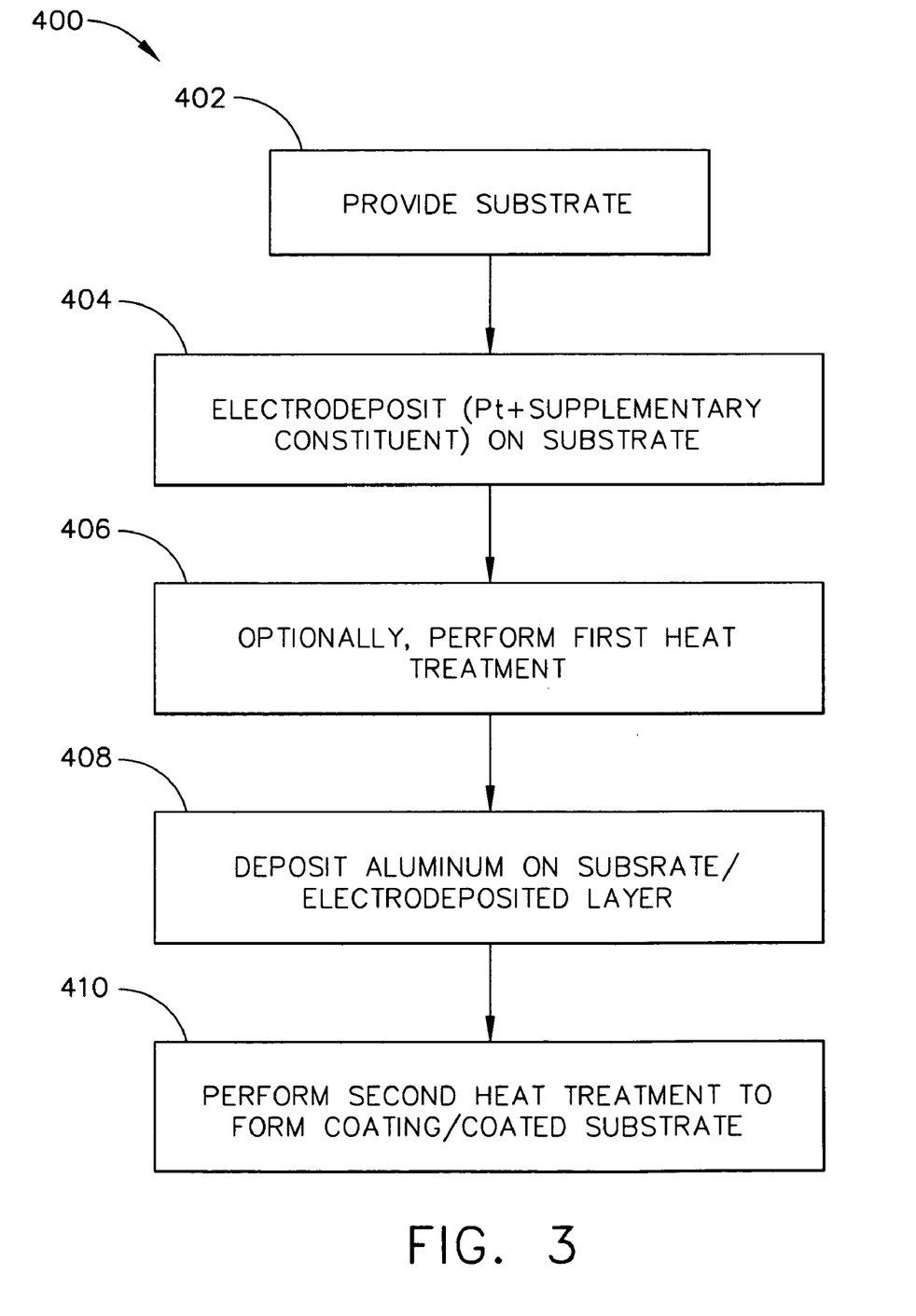
FIG. 3 schematically represents a series of steps involved in a method for forming a corrosion- and oxidation resistant coating on a substrate, according to another embodiment of the invention.

FIG. 3 schematically represents a series of steps involved in a method 400 for forming a corrosion- and oxidation resistant coating on a substrate, according to another embodiment of the invention. Step 402 may involve providing a substrate, generally as described hereinabove with respect to step 302, method 300 (FIG. 2).

Step 404 may involve concurrently depositing platinum metal and at least one supplementary constituent on the substrate surface, via a single electrolyte composition. The electrolyte may have the composition and characteristics described hereinabove. For example, the electrolyte may comprise a platinum salt and particles of one or more supplementary constituents, such as chromium, chromium oxide, Al, Y, Zr, Hf, La, Sc, Si, Ni, Co, Fe, Ta, and Re, or a chromium alloy. Such an alloy of chromium may include one or more metals such as Al, Y, Zr, Hf, La, Sc, Si, Ni, Co, Fe, Ta, and Re. Step 404 may be performed generally as described hereinabove with respect to step 306, method 300 (FIG. 2).

Step 404 may result in the formation of a metal layer comprising platinum metal and particles of a supplementary constituent, e.g., chromium particles, embedded or entrapped within the platinum metal (see, e.g., FIGS. 6A-B, 7A-B).

Step 406 may be similar to step 308 as described hereinabove with reference to method 300 (FIG. 2). In some embodiments, step 406 may involve performing a first heat treatment, or annealing, the substrate. The first heat treatment may be performed at a relatively low temperature sufficient to promote bonding of the electrodeposited layer to the substrate surface. A temperature in the range of from about 550 to 650° C. may be sufficient to promote such bonding of the electrodeposited layer to the substrate surface.

Alternatively, the first heat treatment may be performed at a relatively high temperature sufficient to promote interdiffusion of constituents of the electrodeposited layer with the adjacent surface layer of the substrate surface. A temperature in the range of from about 1000 to 1100° C. may be sufficient to promote such diffusion of constituents of the electrodeposited layer and the substrate. When a heat treatment in the 1000 to 1100° C. range is performed, the resulting coating may comprise a solid solution alloy; e.g., the coating may comprise a metallic solid solution of Ni, Pt and Cr when the substrate is a nickel-base alloy. Step 406 may be performed, for a period in the range of from about 15 minutes to four (4) hours, in a protective atmosphere (e.g., in argon), or under vacuum. In some embodiments, step 406 may be omitted.

Step 408 may involve depositing aluminum on the substrate or electrodeposited layer. The aluminum may be deposited on the substrate using various techniques known in the art, such as chemical vapor deposition (CVD), above the pack, pack aluminizing, physical vapor deposition, or as an aluminum powder slurry. Depending on the deposition technique, step 408 may typically be performed at a temperature in the range of from room temperature to 1100° C. Aluminizing processes conducted above about 800° C. may promote interdiffusion of coating elements with the surface layer of the substrate.

Step 410 may involve performing a second heat treatment on the substrate to form a coating on the substrate. The coating may comprise a platinum aluminide and one or more supplementary constituents. The supplementary constituent(s) may comprise chromium or chromium oxide. The supplementary constituent(s) may alternatively comprise one or more reactive elements, such Al, Y, Zr, Hf, La, Sc, Si, Ni, Co, Fe, Ta, and Re. In some embodiments, the supplementary constituent(s) may comprise chromium or chromium oxide, and may further comprise one or more of the reactive elements, such Al, Y, Zr, Hf, La, Sc, Si, Ni, Co, Fe, Ta, and Re. In other embodiments, the supplementary metal element(s) may comprise a chromium alloy comprising one or more metals such as Al, Y, Zr, Hf, La, Sc, Si, Ni, Co, Fe, Ta, and Re. Step 410 may be performed in a protective atmosphere (e.g., in argon), or under vacuum.

The coating formed according to method 400 may have those characteristics, features and elements as described hereinabove, for example, with reference to FIGS. 1A-B. Thus, the coating formed according to method 400 may serve as a corrosion resistant coating. The coating may also serve as an oxidation resistant coating.

Step 410 may be performed at a relatively high temperature sufficient to promote interdiffusion of constituents of the electrodeposited layer, the aluminum-rich layer, and the surface layer of the substrate. For example, the second heat treatment may be performed at a temperature sufficient to promote diffusion of aluminum with the electrodeposited platinum and chromium, and nickel from the surface layer of a superalloy substrate. Step 410 may be performed at a temperature in the range of from about 1000 to 1100° C., and for a period in the range of from about 15 minutes to four (4) hours. The resulting heat-treated coating may typically comprise a high melting temperature matrix phase, such as (Pt, Ni) Al intermetallic phase, which has finite solubility for the supplementary constituents. Chromium solubility within the (Pt, Ni) Al matrix phase may be limited to a few percent. Excess chromium may be present as discrete particles within the coating.

In contrast to certain line-of-sight deposition and coating techniques of the prior art, methods and processes of the instant invention, for example method 400, can be used to form a uniform coating on substrates having complex geometry.

Figure 4:
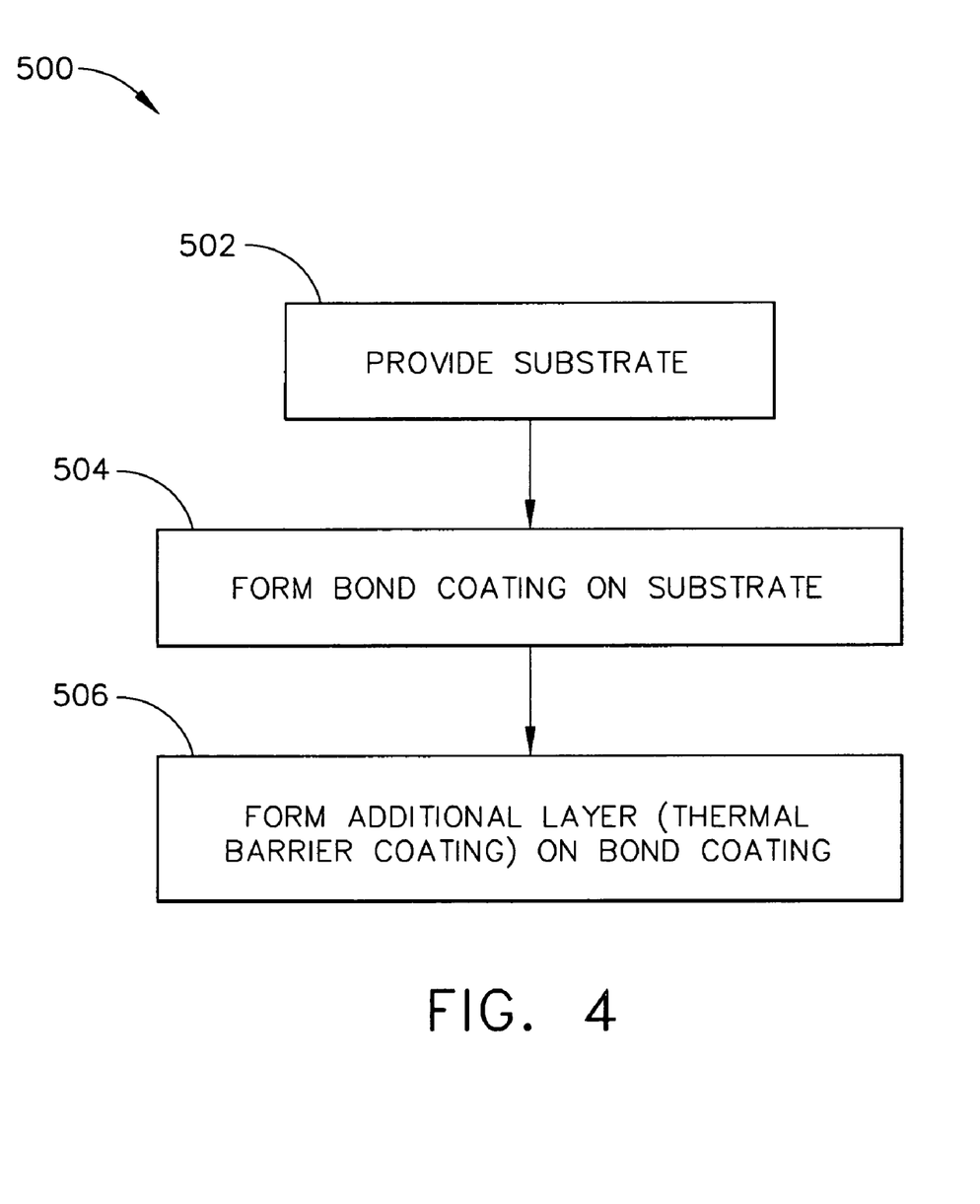
FIG. 4 schematically represents a series of steps involved in a method for coating a component, according to the invention.

FIG. 4 schematically represents a series of steps involved in a method 500 for coating a component, according to another embodiment of the invention. Step 502 may involve providing a substrate, for example, generally as described hereinabove with respect to step 302, method 300. Step 504 may involve forming a bond coating on the substrate. The bond coating formed in step 504 may be a platinum aluminide coating comprising platinum metal and chromium or a supplementary constituent that enhances oxide scale adhesion, such as Y, Zr, Hf, La, or Sc. The bond coating formed in step 504 may be formed generally as described hereinabove for steps 404 through 410 of method 400 (FIG. 3).

Step 506 may involve forming an additional layer on the bond coating. In some embodiments, the additional layer formed in step 506 may be a thermal barrier coating. As an example, a thermal barrier coating formed on the bond coating may comprise a stabilized zirconia, such as an yttria stabilized zirconia. A thermal barrier coating formed on the bond coating may be deposited by various deposition processes known in the art, such as electron beam physical vapor deposition (EB-PVD) or a plasma spray process. A thermal barrier coating is disclosed in commonly assigned, co-pending U.S. patent application Ser. No. 10/621,981, filed Jul. 16, 2003 (entitled: Thermal Barrier Coating with Stabilized Compliant Microstructure), the disclosure of which is incorporated by reference herein in its entirety.

Figure 5A:
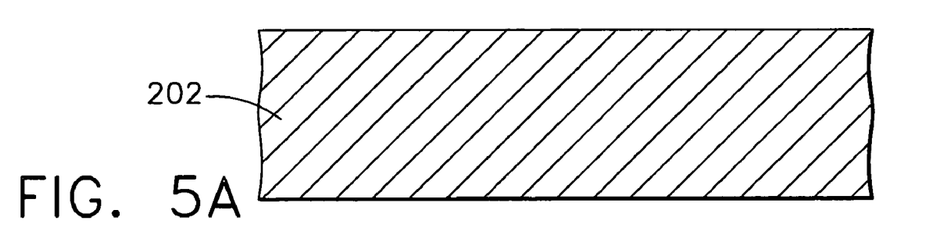
FIGS. 5A-D schematically represent stages in preparing a corrosion- and oxidation protective coating, according to another embodiment of the invention.
Figure 5B:
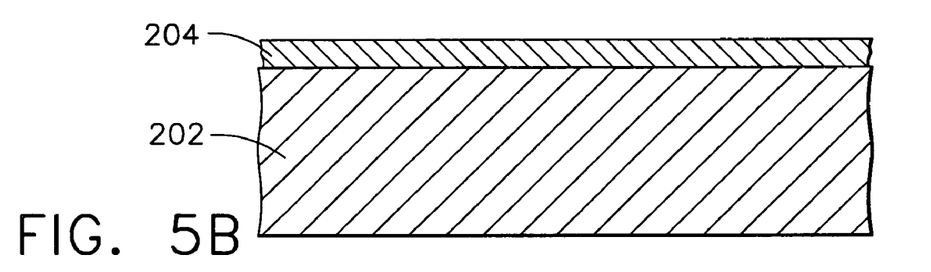

FIGS. 5A-D schematically represent stages in preparing a corrosion- and/or oxidation protective coating, according to one embodiment of the instant invention. FIG. 5A represents a substrate 202 as seen in cross-section. FIG. 5B represents substrate 202 having an electrodeposited layer 204 disposed thereon. Electrodeposited layer 204 may comprise electrodeposited platinum metal, together with entrapped particles of a supplementary constituent. The supplementary constituent may comprise particles of chromium or chromium oxide. The supplementary constituent may further comprise particles of a reactive element such as Al, Y, Zr, Hf, La, Sc, Si, Ni, Co, Fe, Ta, and Re. In some embodiments, the supplementary constituent may comprise particles of an alloy comprising chromium and one or more of Al, Y, Zr, Hf, La, Sc, Si, Ni, Co, Fe, Ta, and Re. According to one aspect of the invention, electrodeposited layer 204 may be deposited in a single electrolytic step via an electrolyte composition comprising a platinum salt and particles of a suspended supplementary constituent.

Figure 5C:
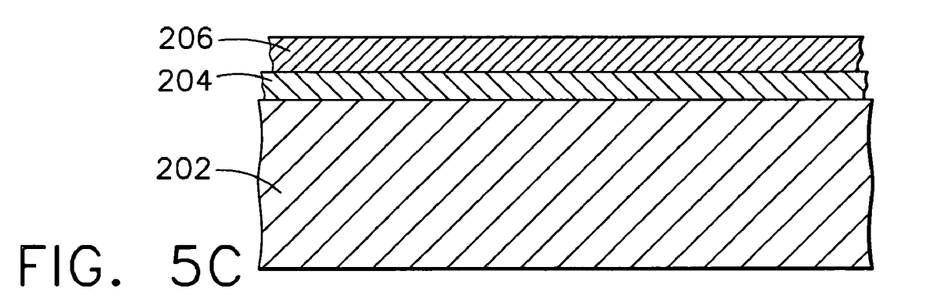
Figure 5D:
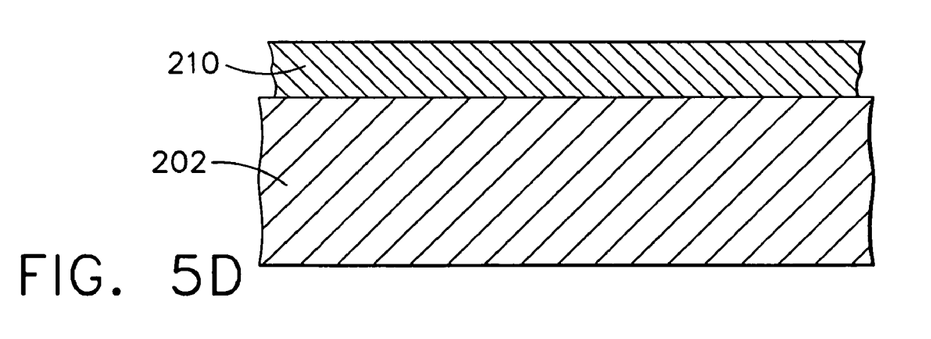

FIG. 5C represents an aluminized substrate 202 having an aluminum layer 206 deposited on electrodeposited layer 204. FIG. 5D represents a platinum aluminide coating 210 on substrate 202. Platinum aluminide coating 210 may be formed from electrodeposited layer 204, and aluminum layer 206, and the surface layer of the substrate following heat treatment. The heat treatment may be sufficient to interdiffuse at least a portion of electrodeposited layer 204 and aluminum layer 206 with the surface layer of substrate 202. The heat treatment may also be sufficient to dissolve entrapped particles of a supplementary constituent (e.g., chromium), permitting it to become a constituent in the intermetallic solid solution matrix phase of the platinum aluminide coating.

EXAMPLES

Example 1

A solution comprising 12 g/L Pt and 100 g/L $Na_2CO_3$ was prepared by dissolving 40 g dinitrodiamine platinum (Pt $(NH_3)_2NO_2)_2$) (60.0% Pt), and 200 g $Na_2CO_3$, in 2 L water. Electrolyte compositions were prepared from the solution by adding various amounts of Cr metal powder (Reade Advanced Materials, Providence, R.I. USA) to the dinitrodiamine Pt/$Na_2CO_3$ solution. The Cr metal powder had a particle size of about 4 microns.

A nickel (Ni) sheet 2.54 cm×1.27 cm×0.080 cm (6.5 $cm^2$) was mechanically polished and chemically activated in 18% HCl for 1 min (per ASTM B558-79, 4.6). The Ni sheet was electroplated for 1 h using 2 Pt anodes at a voltage of 1.80 V, current density 2.0-2.9 A/$dm^2$, at a bath temperature of 82 to 86° C. with magnetic stirring of the electrolyte.

Example 2

A Cr containing Pt metal layer (Pt+Cr layer) was electrodeposited on a Ni sheet from a Pt electrolyte composition (prepared according to Example 1) containing 10 g/L Cr metal powder. The weight of the Ni sheet prior to plating was 2.161 g. The weight of the Ni sheet with the Pt+Cr electroplated layer was 2.282 g. The weight of the Pt+Cr electroplated layer was 0.121 g. The thickness of the Pt+Cr electroplated layer was calculated from weight gain to be 8.7 microns, assuming that the electroplated layer consists of pure Pt.

Example 3

Figure 6A:
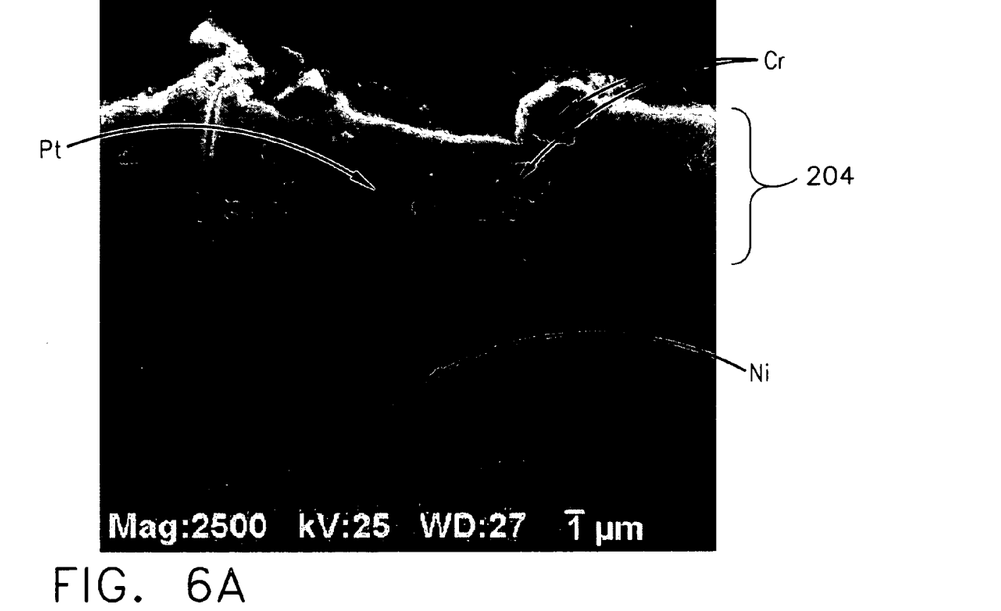
FIG. 6A is a scanning electron micrograph of an electroplated chromium containing platinum metal layer on a nickel substrate, according to another embodiment of the invention.
Figure 6B:
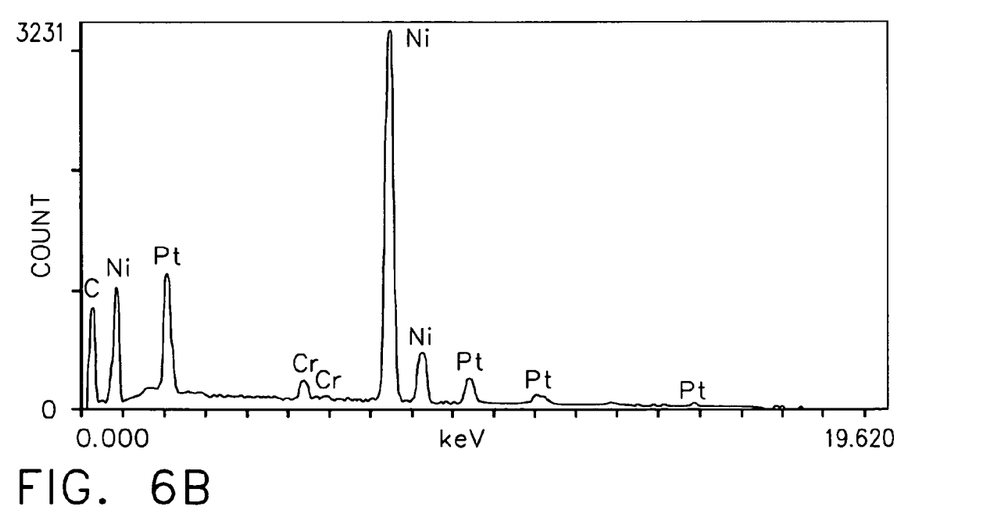
FIG. 6B is an energy-dispersive x-ray spectrum taken from the image area of FIG. 6A.

A Ni sheet electroplated with a Cr containing platinum (Pt+Cr) layer was annealed at 600° C. for 30 min in argon. A scanning electron micrograph (original magnification, 2,500×) of a polished section of the Pt+Cr electroplated layer 204 is shown in FIG. 6A. Cr particles, entrapped within the volume of the Pt metal of the electroplated layer, are clearly visible. No gaps are visible around the Cr particles. Similarly, there appears to be good bonding between the Pt and Ni substrate. The thickness of the Pt+Cr electroplated layer is mostly less than about 10 microns. FIG. 6B is an energy-dispersive x-ray (EDX) spectrum taken from the image area of FIG. 6A, indicating elemental x-ray peaks for Pt, Cr, and Ni.

Figure 7A:
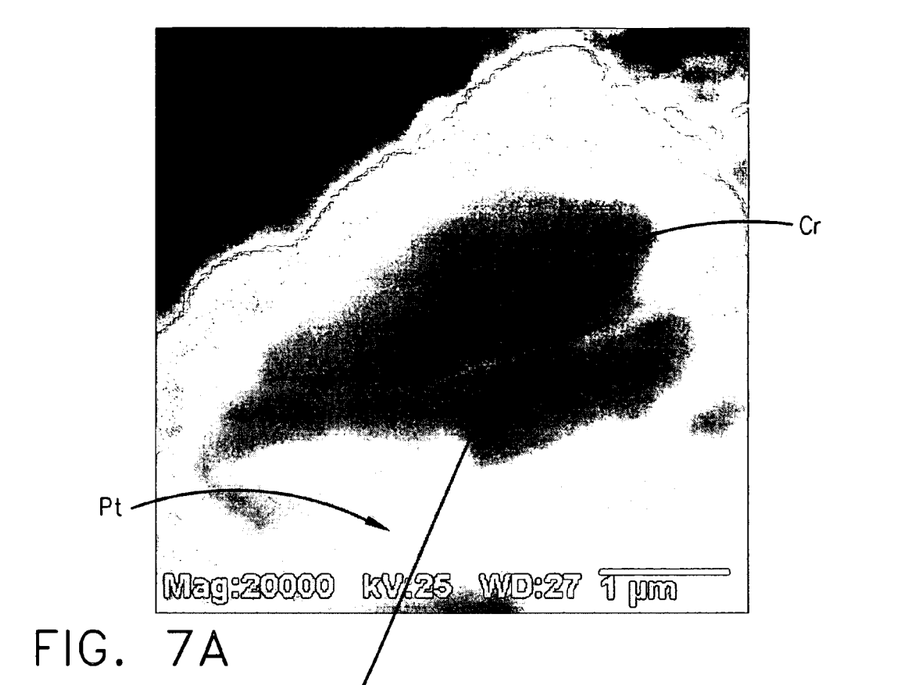
FIG. 7A is a scanning electron micrograph of an electroplated chromium containing platinum metal layer showing a chromium particle entrapped within the electroplated layer, also according to the invention.
Figure 7B:
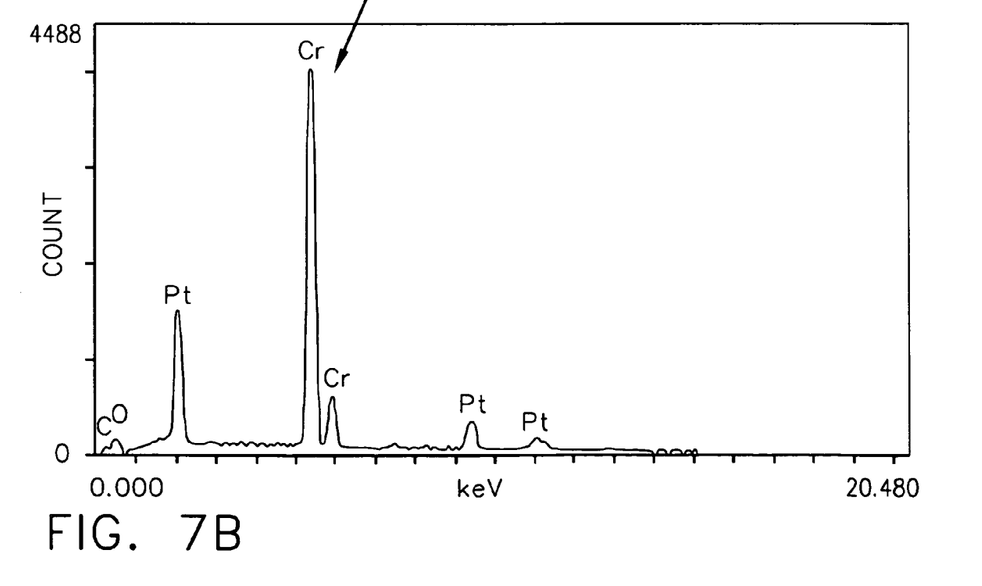
FIG. 7B is an energy-dispersive x-ray spectrum taken from the chromium particle shown in FIG. 7A, according to the invention.

FIG. 7A is a higher magnification scanning electron micrograph (original magnification, 20,000×) of a polished section of the Pt+Cr electroplated layer. FIG. 7A clearly shows a Cr particle entrapped within the Pt metal of the electroplated layer. FIG. 7B is an energy-dispersive x-ray (EDX) spectrum taken from the Cr particle shown in FIG. 7A. FIG. 7B indicates elemental x-ray peaks for Cr and Pt.

Example 4

Figure 8A:
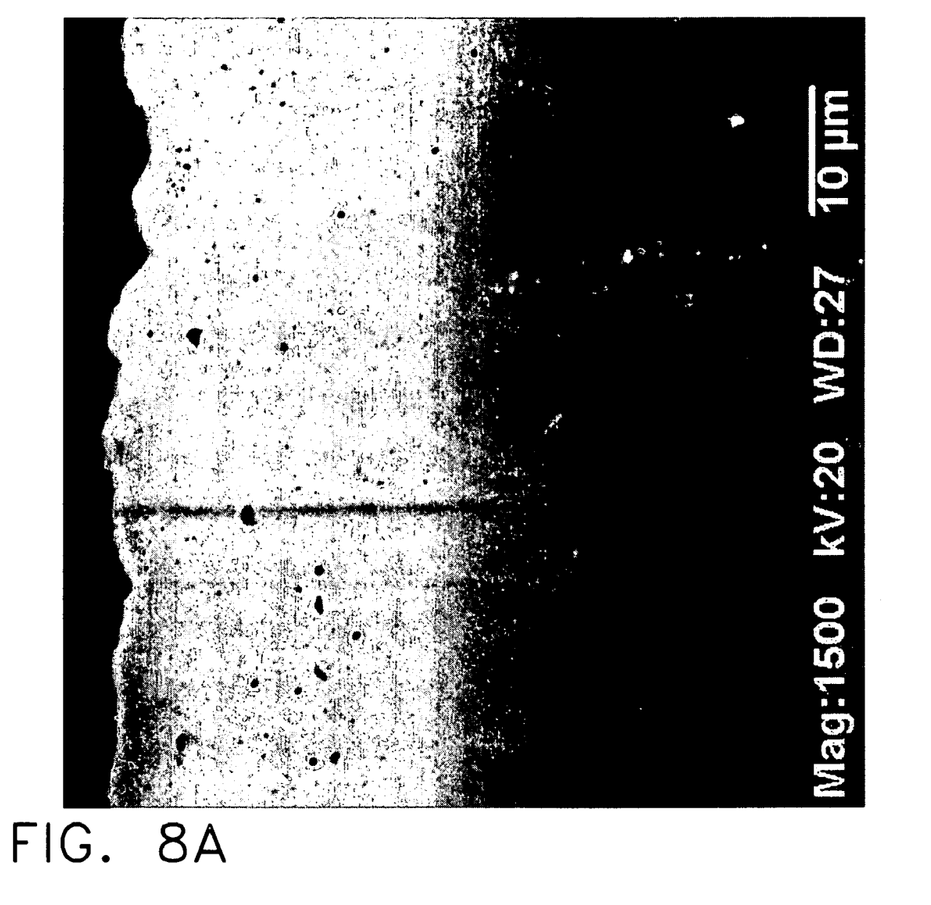
FIG. 8A is a scanning electron micrograph of an annealed electroplated chromium containing platinum metal layer, also according to the invention.

A Ni sheet electroplated with a Cr containing platinum (Pt+Cr) layer as described hereinabove was heat treated at 1065° C. for 60 min in argon. A scanning electron micrograph (original magnification, 1,500×) of the Pt+Cr electroplated layer after heat treatment is shown in FIG. 8A. Cr particles are no longer visible, indicating that heat treatment at 1065° C. for 60 min may be sufficient to diffuse or dissolve the Cr, as well as the surface of the nickel substrate, into the platinum metal.

Figure 8B:
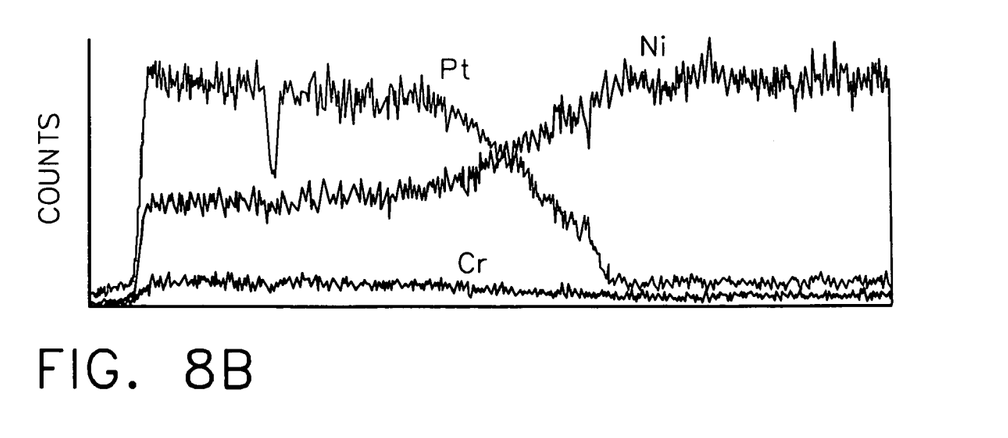
FIG. 8B is an energy-dispersive x-ray line-scan corresponding to the profile of the image area of FIG. 8A.

FIG. 8B is an energy-dispersive x-ray (EDX) line-scan corresponding to the profile of the image area of FIG. 8A. FIG. 8B shows the elemental x-ray profile for Pt, Cr, and Ni from the surface of the electroplated and annealed layer to the Ni substrate. It can be seen that, in the region of the electroplated layer/substrate interface, the Pt concentration decreases and the Ni concentration increases with increasing distance from the surface. The concentration of Cr remains approximately constant until the Pt level begins to decline.

It should be understood, of course, that the foregoing relates to preferred embodiments of the invention and that modifications may be made without departing from the spirit and scope of the invention as set forth in the following claims.

We claim:

1. A method for electroplating platinum, comprising:
   a) providing a substrate;
   b) electrolytically depositing a metal layer on a surface of said substrate, wherein said metal layer comprises platinum and a supplementary constituent, said supplementary constituent comprising particles selected from the group consisting of Cr, Si, Zr, and alloys thereof,
   wherein said metal layer is deposited from a single electrolyte composition during a single electrolytic step,
   wherein said electrolyte composition comprises a platinum salt and particles of said supplementary constituent having a mean particle diameter ranging between 1 micron and 10 microns and said particles do not include aluminum, and
   wherein said particles of said supplementary constituent are deposited in said metal layer from said electrolyte composition, and
   c) after said step b), aluminizing said metal layer of said substrate.

2. The method of claim 1, wherein said metal layer further comprises at least one reactive element selected from the group consisting of Y, Zr, Hf, La, Sc, Si, Ta, and Re.

3. The method of claim 1, wherein said supplementary constituent comprises chromium oxide.

4. The method of claim 3, wherein said metal layer further comprises at least one reactive element selected from the group consisting of Y, Hf, La, Sc, Ta, and Re.

5. The method of claim 1, wherein said substrate comprises an alloy, and the method further comprises:
   d) heating said substrate to form an intermetallic matrix coating from said metal layer, wherein said intermetallic matrix coating comprises platinum, aluminum, said supplementary constituent, and constituents of said alloy substrate.

6. The method of claim 1, wherein said electrolytically deposited metal layer forms a coating on a surface of said substrate, said coating comprising said supplementary constituent, and said substrate comprising an alloy, and the method further comprising:
   after said step b), heat treating said coating and said substrate surface to form a metallic solid solution comprising platinum metal, said supplementary constituent, and constituents of said substrate.

7. A method for electroplating platinum on a substrate, comprising:
   a) electroplating platinum metal on said substrate via an electrolyte comprising particles of a supplementary constituent and a reactive element, said supplementary constituent having a mean particle diameter ranging between 1 micron and 10 microns, and said particles not including aluminum; and
   b) concurrently with said step a), depositing said particles of said supplementary constituent on said substrate to form a layer comprising platinum and the particles of the supplementary constituent,
   wherein said supplementary constituent comprises particles selected from the group consisting of Cr, Si, Zr, and alloys thereof, and at least one reactive element selected from the group consisting of Y, Hf, La, Sc, Ta, and Re, and
   c) after said step b), aluminizing said layer comprising platinum and the particles of the supplementary constituent.

8. The method of claim 7, wherein said particles of said supplementary constituent are entrapped within said platinum metal.

9. The method of claim 7, wherein said particles of said supplementary constituent comprise chromium metal powder.

10. The method of claim 7, wherein said electrolyte comprises dinitrodiamine platinum.

11. The method of claim 7, wherein said step a) comprises applying a voltage of from about 1.2 to 2.2 volts between said substrate and an anode.

12. A process for preparing a coated component, comprising:
   a) providing a substrate; and
   b) electroplating a metal layer on a surface of said substrate from an electrolytic bath comprising a platinum salt electrolyte and particles of at least one supplemental constituent having a mean particle diameter ranging between 1 micron and 10 microns, wherein said electroplated metal layer comprises platinum metal and particles of the at least one supplementary constituent and at least one reactive element entrapped within said platinum metal, wherein said particles do not include aluminium and at least one supplementary constituent comprises particles selected from the group consisting of Cr, Si, Zr, and alloys thereof and the at least one reactive element is selected from the group consisting of Y, Hf, La, Sc, Ta, and Re;
   c) depositing aluminum on said electroplated metal layer; and
   d) forming a platinum aluminide coating on said substrate, wherein said platinum aluminide coating comprises said at least one supplementary constituent and at least one reactive element.

13. The process of claim 12, wherein said particles and said platinum metal are co-deposited from a single electrolyte composition, and said electrolyte composition comprising said particles.

14. The process of claim 13, further comprising:
   e) during said step b), maintaining said particles in suspension.

15. The process of claim 13, wherein said electrolyte composition comprises from about 0.2 to 400 g/L of said particles, and wherein said particles comprise chromium metal powder.

16. The process of claim 12, further comprising:
   f) after said step b) and prior to said step c), heating said substrate.

17. The process of claim 16, wherein said step f) comprises heating said substrate to a temperature sufficient to bond said electroplated metal layer to said substrate.

18. The process of claim 17, wherein said temperature sufficient to bond said electroplated metal layer to said substrate is in the range of from about 300 to 650° C.

19. The process of claim 16, wherein said step f) comprises heating said substrate to a temperature sufficient to interdiffuse at least a portion of said electroplated metal layer with said substrate.

20. The process of claim 19, wherein said temperature sufficient to interdiffuse at least a portion of said electroplated metal layer with said substrate is in the range of from about 1000 to 1100° C.

21. A process for preparing a coated component, comprising:
   a) providing a substrate;
   b) electroplating a platinum metal layer on said substrate, wherein said platinum metal layer is electrodeposited via an electrolyte composition comprising a platinum salt and chromium particles having a mean particle diameter ranging between 1 micron and 10 microns, said particles not including aluminum;
   c) concurrently with said step b), depositing said chromium particles on said substrate as part of the platinum metal layer, wherein said chromium particles are entrapped within said platinum metal layer;
   d) optionally, exposing said substrate to a first heat treatment;
   e) thereafter, aluminizing said substrate; and
   f) exposing said substrate to a second heat treatment to form a platinum aluminide coating on said substrate, wherein said platinum aluminide coating comprises:
   chromium within an intermetallic solid solution phase; and
   said chromium particles dispersed within said intermetallic solid solution phase.

22. The process of claim 21, wherein said electrolyte composition further comprises dinitrodiamine platinum.

23. The process of claim 21, wherein said electrolyte composition further comprises at least one reactive element selected from the group consisting of Y, Hf, La, Sc, Ta, and Re.

24. The process of claim 21, further comprising:
   g) during said step b), stirring said electrolyte composition to maintain said chromium particles in suspension.

* * * * *

UNITED STATES PATENT AND TRADEMARK OFFICE
CERTIFICATE OF CORRECTION

PATENT NO. : 7,604,726 B2 Page 1 of 1
APPLICATION NO. : 10/753675
DATED : October 20, 2009
INVENTOR(S) : Kozlov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Fifth Day of October, 2010

David J. Kappos
*Director of the United States Patent and Trademark Office*